United States Patent [19]

Kobayashi et al.

[11] Patent Number: 4,861,282
[45] Date of Patent: Aug. 29, 1989

[54] WATERPROOF CONNECTING STRUCTURE FOR CONNECTOR

[75] Inventors: Yasuo Kobayashi; Masahiko Endo, both of Shizuoka, Japan

[73] Assignee: Yazaki Corporation, Tokyo, Japan

[21] Appl. No.: 280,901

[22] Filed: Dec. 7, 1988

[30] Foreign Application Priority Data

Dec. 9, 1987 [JP] Japan ............................ 62-186384[U]

[51] Int. Cl.⁴ .................... H01R 13/518; H01R 13/60
[52] U.S. Cl. .................................... 439/540; 439/545; 439/559
[58] Field of Search ............... 439/556, 559, 562, 564, 439/565, 715–717, 567, 569, 540, 541, 545, 548, 549, 552–555, 560

[56] References Cited

U.S. PATENT DOCUMENTS 3,002,175  9/1961  Bertram et al. ...................... 439/564
3,611,256 10/1971  Abair ................................... 439/559
4,607,135  8/1986  Taybl et al. ......................... 439/716

FOREIGN PATENT DOCUMENTS 1590478  6/1981  United Kingdom ................ 439/559

Primary Examiner—Gary F. Paumen
Attorney, Agent, or Firm—Sughrue, Mion, Zinn, Macpeak & Seas

[57] ABSTRACT

A waterproof connecting structure for a connector in a hole of a panel is disclosed which comprises connector elements connected to electric cords, respectively, and fitted to each other in an opposed manner; a waterproof grommet provided near one of the connector elements; a connector holder which is secured in the hole in a watertight manner with a first seal on the peripheral portion of the holder and conjoined at one side of the holder to the other one of the connector elements and has an opening and grommet fitting portions at the other side of said holder; and a cover for closing the opening with a second seal in a watertight manner.

6 Claims, 4 Drawing Sheets

WATERPROOF CONNECTING STRUCTURE FOR CONNECTOR

BACKGROUND OF THE INVENTION

The present invention relates to a waterproof connecting structure for a connector for connecting electric wires in an interior and an exterior of a driver's space of a motor vehicle or the like to each other through a panel.

An electric cord of great length for an electric appliance needs to be inserted through the panel of the door or body of a motor vehicle or the like. In that case, a hole is made in the panel to insert the electric cord through it. However, it is very troublesome to insert the electric cord of great length through the hole of the panel, and it is likely that the cord will be inserted in the wrong direction through the hole. To cope with these problems, electric cords each having a smaller length can be connected to each other by a connector in the hole of the panel so that it is unnecessary to insert the electric cord of great length through the hole of the panel. The efficiency of work can thus be improved.

A conventional waterproof connecting structure for such improvement was disclosed in the Japanese Utility Model Application (OPI) No. 117622/85 (the term "OPI" as used herein means an "unexamined published application"). The connecting structure is described with reference to FIG. 1 from now on. FIG. 1 shows a panel 7, a hole 7a provided in the panel, a connector holder 20 secured in the hole, connector elements 8 connected to an exterior electric cord 10', connector elements 9 opposed to the connector elements 8 which are connected to an interior electric cord 10 and secured to the connector holder, and a grommet 11 attached to the exterior electric cord and fitted in the hole. To connect the interior and the exterior electric cords 10 and 10' to each other by the connecting structure, the connector elements 9 are first secured to the connector holder 20, the other connector elements 8 are then fitted in the connector case, and the grommet 11 is thereafter fitted in the hole 7a of the panel 7.

Since the grommet 11 provided on the exterior electric cord 10' is fitted in the hole 7a of the panel 7 in a waterproof manner, the conventional waterproof connecting structure has a disadvantage that only one pair of the interior and the exterior electric cords 10 and 10' can be connected to each other through the single hole of the panel.

SUMMARY OF THE INVENTION

The present invention was made in order to eliminate the above-mentioned disadvantage. Accordingly, it is an object of the present invention to provide a waterproof connecting structure capable of connecting a plurality of pairs of electric cords to each other through a single hole of a panel in a waterproof manner.

The waterproof connecting structure provided in accordance with the present invention comprises connector elements connected to electric cords, respectively, and fitted to each other in an opposed manner; a waterproof grommet provided near one of the connector elements; a connector case which is secured in the hole of the panel in a watertight manner with a first seal on the peripheral portion of the connector holder and conjoined at one side of the holder to the other one of the connector elements and has an opening and grommet fitting portions at the other side of the holder; and a cover for closing the opening of the conductor case with a second seal in a watertight manner.

DETAILED DESCRIPTION OF THE PREFERRED EMBODIMENTS

Embodiments of the present invention are hereafter described with reference to the drawings attached hereto.

Figure 1:
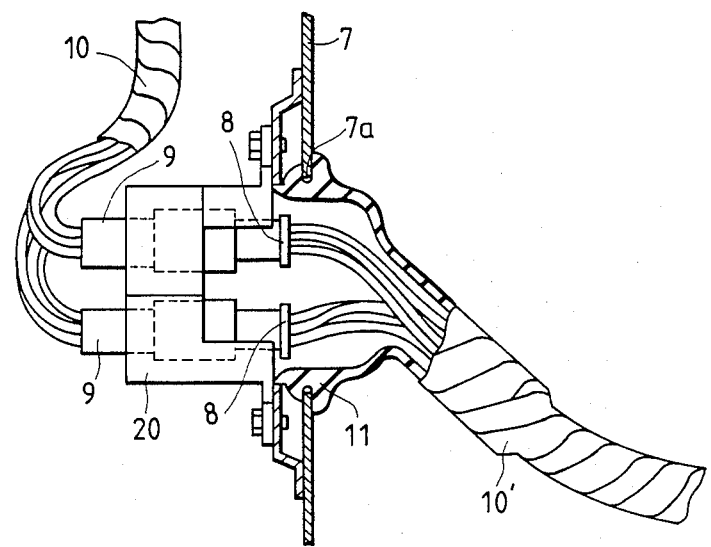
FIG. 1 shows a sectional view of a conventional waterproof connecting structure.
Figure 2:
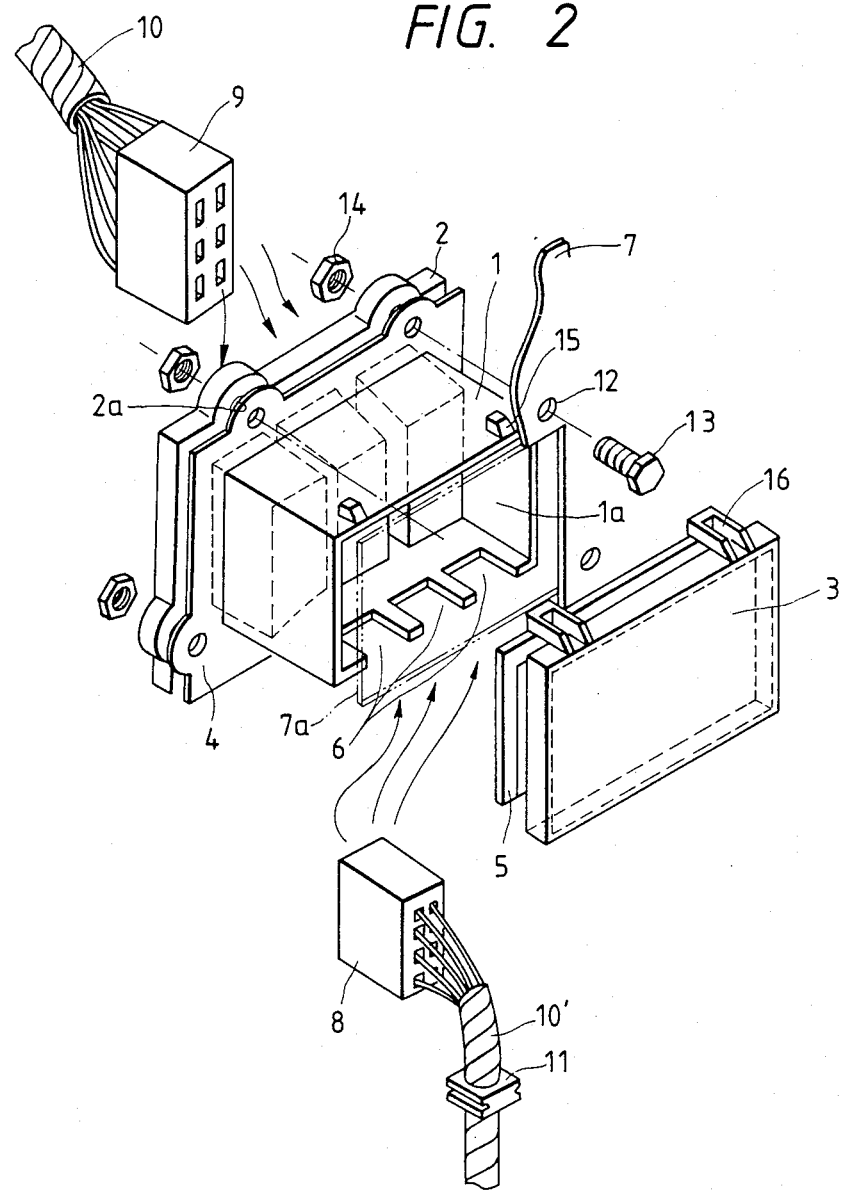
FIG. 2 shows an exploded perspective view of a waterproof connecting structure which is an embodiment of the present device.

FIG. 2 shows a perspective view of a waterproof connecting structure which is one of the embodiments. The connecting structure comprises a connector holder 1 having an opening 1a at the end thereof in the exterior of a room; a flange 2 for attaching the connector holder to a panel 7 having a hole 7a; bolt holes 2a provided in the flange 2; a cover 3 for closing the opening of the connector holder; a first seal 4 provided on the flange; a second seal 5 stuck to the cover; grommet fitting portions 6 provided in the lower part (as to FIG. 2) of the connector holder; an exterior connector element 8 located at the exterior of the room; an interior connector element 9 disposed at the interior of the room; a waterproof grommet 11; bolt holes 12 provided in the panel; bolts 13 and nuts 14. The interior connector elements 9 are connected to an interior electric cord 10 disposed in the interior of the room. The exterior connector elements 8 are connected to an exterior electric cord 10' disposed in the exterior of the room. The grommet 11 is provided on the exterior electric cord 10' near the end thereof at the exterior connector elements 8. Since each grommet fitting portion 6 is open at one end thereof as shown in FIG. 2, it is easy to attach the exterior connector elements 8 and the grommet 11 to the interior connector elements 9 and the connector holder 1, respectively. However, each grommet fitting portion 6 may not be disposed in the manner shown in FIG. 2. Sockets and plugs, which are not shown in the drawings, are provided in the connector elements 8 and 9 so that the sockets and the plugs are electrically connected to each other when the connector elements are fitted to each other. The second seal 5 is stuck to the inside surface of the cover 3 to seal the connector holder 1 in a watertight manner when engaging projections 15 are fitted in engaging grooves 16.

Figure 3:
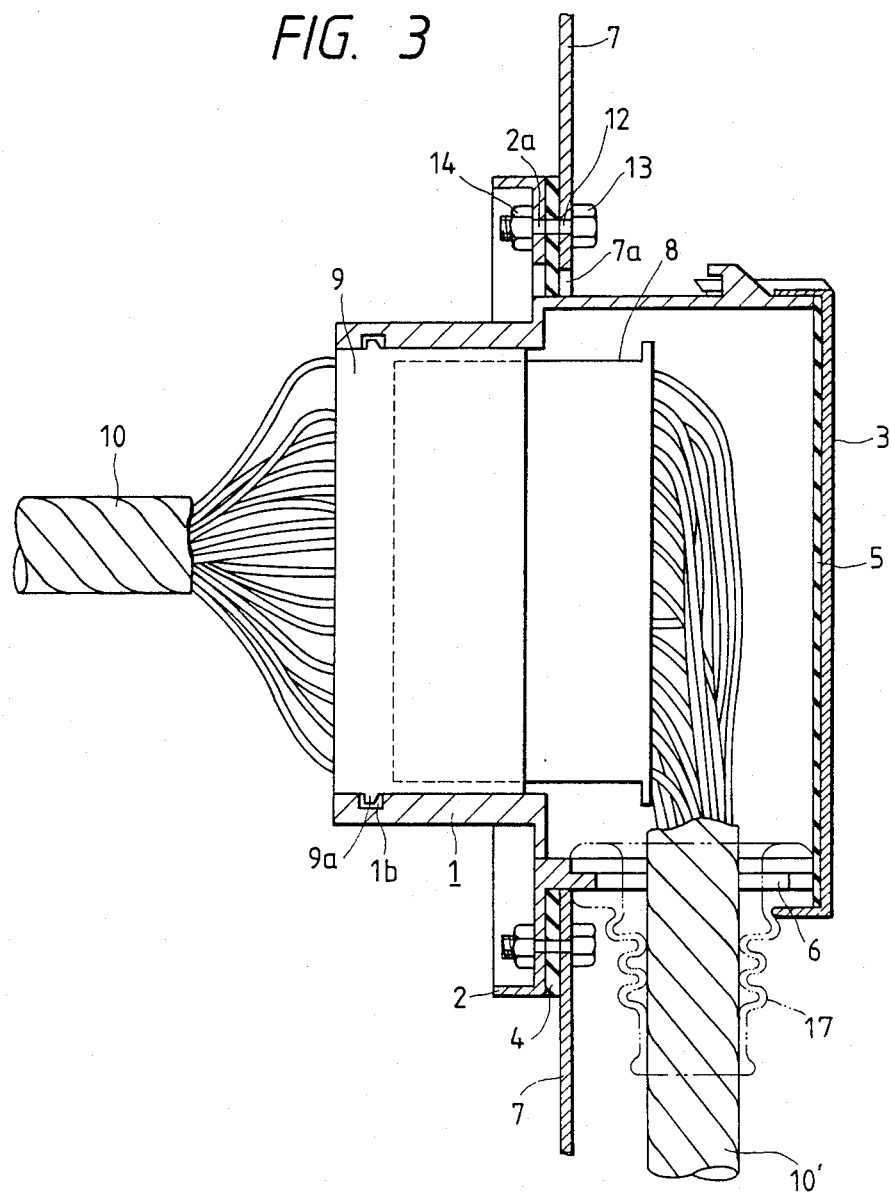
FIG. 3 shows a sectional view of the waterproof connecting structure in a state of connection.

FIG. 3 shows a sectional view of the waterproof connecting structure having the exterior and the interior connector elements 8 and 9 fitted to each other. The procedure of assembling the connecting structure is described with reference to FIG. 3 from now on. The connector holder 1 is first secured in the hole 7a of the panel 7 by inserting the bolts 13 into the bolt holes 12 of the panel 7 and the bolt holes 2a of the flange 2 and tightening the nuts 14 on the bolts. At this time, the first seal 4 is fitted between the flange 2 and the panel 7 so that the connector holder 1 is sealed to the panel 7 in a watertight manner. The interior connector holder 9 is then secured in a prescribed position in the connector holder 1. Simultaneously, the engaging projections 9a of the interior connector elements 9 are fitted in the engaging grooves 1b of the connector holder 1 so that the holder and the case are conjoined to each other. Thereafter, the exterior connector element 8 is fitted in the interior connector element 9, and a grommet 17 is fitted in the grommet fitting portion 6. Finally, the cover 3 stuck with the second seal 5 is attached to the connector holder 1, thus completing the assembly of the connecting structure.

Although only one pair of the electric cords 10 and 10' are shown in the drawings, the plural grommet fitting portions 6 are provided and the connector holder 1 has a plurality of housing sections so that a plurality of pairs of electric cords can be connected to each other by the waterproof connecting structure.

Figure 4:
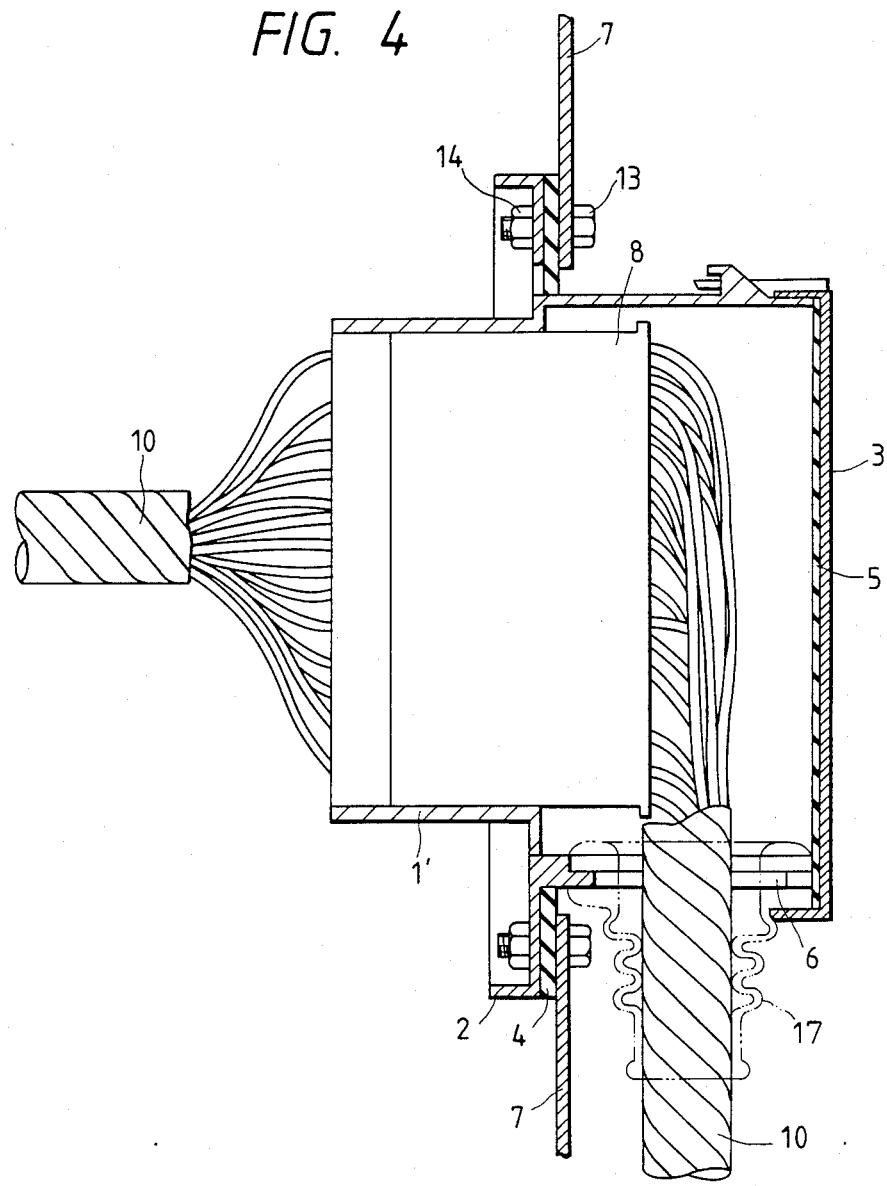
FIG. 4 shows a sectional view of a waterproof connecting structure being another embodiment of the present device and being in a state of connection.

FIG. 4 shows a sectional view of a waterproof connecting structure which is the other one of the embodiments. In the connecting structure, a connector holder 1' including an interior connector element is provided so that an interior electric cord 10 can be connected to the connector holder in advance to enhance the efficiency of work further.

According to the present device, a plurality of pairs of electric cords can be connected to each other and held on a panel in a watertight manner. Since the connected portions of the electric cords are protected from water by a first and a second seal, connector elements do not need to be waterproof.

We claim:

1. A waterproof connecting structure for a connector in a hole of a panel; comprising:
   at least one pair of first and second connector elements connected to electrical cords, respectively, and mated to each other in an opposed manner;
   a waterproof grommet provided on the cord of the first said connector element;
   a connector holder secured in said hole in a watertight manner by means of a first resilient seal on a peripheral portion of said holder which engages the periphery of said hole, said holder being conjoined at one side thereof to the second said connector element, said connector holder having an opening and grommet fitting portions at an opposite side of said holder, said grommet being received in one of said grommet fitting portions which is located on the periphery of said holder; and
   a cover with a second resilient seal for closing and opening in a watertight manner, wherein there is a said grommet, cord and first connector element for each of said grommet fitting portions so that said opposite side of said holder is watertight.

2. The structure of claim 1, further comprising a plurality of pairs of said first and second connector elements.

3. The structure of claim 1, wherein said second connector element is formed integrally with said connector holder.

4. The structure of claim 2, wherein each of said second connector elements is formed integrally with said connector holder.

5. The structure of claim 1, wherein said first and second connector elements are located on an interior side and an exterior side of said panel respectively.

6. The structure of claim 2, wherein said first and second connector elements are located on an interior side and an exterior side of said panel, respectively.

* * * * *